United States Patent

Lermuzeaux et al.

Patent Number: 5,848,232
Date of Patent: Dec. 8, 1998

[54] METHOD OF MAKING SECURE COLLABORATION BETWEEN OBJECTS OF AN OBJECT-ORIENTED PROGRAM

[75] Inventors: Jean-Marc Lermuzeaux, St Michel sur Orge; Neil Butler, Paris, both of France

[73] Assignee: Alcatel Alsthom Compagnie Generale D'Electricite, Paris, France

[21] Appl. No.: 772,577

[22] Filed: Dec. 26, 1996

[30] Foreign Application Priority Data

Dec. 27, 1995 [FR] France ................................... 95 15542

[51] Int. Cl.⁶ .......................................................... H04L 9/00
[52] U.S. Cl. .............................................. 395/187.01; 380/4
[58] Field of Search ............................. 395/187.01, 186, 395/188.01, 335, 609, 244; 380/4

[56] References Cited

U.S. PATENT DOCUMENTS

| | | | |
|---|---|---|---|
| 5,241,594 | 8/1993 | Kung | 380/4 |
| 5,335,346 | 8/1994 | Fabbio | 711/163 |
| 5,550,968 | 8/1996 | Miller et al. | 395/157 |
| 5,629,981 | 5/1997 | Nerlikar | 380/25 |
| 5,644,727 | 7/1997 | Atkins | 395/240 |
| 5,696,966 | 12/1997 | Velarde | 395/610 |

*Primary Examiner*—Ly Hua
*Attorney, Agent, or Firm*—Sughrue, Mion, Zinn, Macpeak & Seas, PLLC

[57] ABSTRACT

A method consists in assigning an authorization level (AUTH) to a client object and a "dynamic" sensitivity level (DSL) to a method (or data processing procedure) of a server object (ProcObjSv). The dynamic sensitivity level is computed based on static sensitivity levels (SSLs) at the moment when the server object is instantiated. The authorization level of the client object is passed to the method of the server object when the method of the server object is invoked by the client object, and this authorization level (AUTH) is compared with the dynamic sensitivity level (DSL) of the method in order to control access. The method makes it possible to implement a multi-level security model.

2 Claims, 1 Drawing Sheet

METHOD OF MAKING SECURE COLLABORATION BETWEEN OBJECTS OF AN OBJECT-ORIENTED PROGRAM

BACKGROUND OF THE INVENTION

The invention relates to making object-oriented programs secure.

More particularly, the invention relates to a method of making secure collaboration between a data processing procedure of a client object and another data processing procedure of a server object.

Collaboration between a data processing procedure of a client object and a data processing procedure of a server object results from a service request issued by the client object to the server object. This service request is conventionally implemented by calling or invoking the data processing procedure of the server object in the source code of the data processing procedure of the client object.

During execution of an object-oriented program that has not been made secure, objects are created in response to instantiation requests, and access to the data of one object (server object) by another object (client object) is made possible by means of collaboration between two processing procedures, one belonging to the client object and the other to the server object. It follows that this type of uncontrolled collaboration can turn out to be dangerous for the confidentiality and the integrity of sensitive data in the program.

SUMMARY OF THE INVENTION

The object of the invention is to propose a solution to this problem of controlling access.

This object is achieved by a method of making secure, in an object-oriented program, collaboration between a data processing procedure of a client object and another data processing procedure of a server object of said program, the method comprising:

assigning an authorization level to the client object;

assigning a "dynamic" sensitivity level to the data processing procedure of the server object when said server object is instantiated by an object constructor, said dynamic sensitivity level being computed on the basis of static sensitivity levels and an authorization level passed to the object constructor, the static sensitivity levels being held in memory and being assigned respectively to different logical entities of the program;

causing the authorization level assigned to the client object to be passed to the data processing procedure of the server object via the message sent by the data processing procedure of the client object to, invoke the data processing procedure of said server object; and checking in the data processing procedure of the server object whether the authorization level which has been passed thereto is sufficient compared with the dynamic sensitivity level which has been assigned thereto.

Thus, access to the data of the server object by the client object can be controlled or even forbidden. The mechanisms for performing such control can be implemented in the source code of the program to be made secure in a manner that is relatively independent of the portion of the code relating to the application of the program. It is thus possible to implement them by automatic processing of the file(s) containing the source code of the program to be made secure.

Such a method comes within a multi-level object-oriented security model with secure data having a level of granularity that reaches not only classes of objects and objects, but also class attributes and data processing procedures of said objects (said procedures corresponding is to class methods in the broad sense of object-oriented programming).

BRIEF DESCRIPTION OF THE DRAWINGS

The characteristics and advantages of the invention appear more clearly on reading the following description of an implementation and from the accompanying drawings.

DESCRIPTION OF THE PREFERRED EMBODIMENT

The "security" offered by the program that has been made secure is defined by a formal security model based on the multi-level security policy of Bell & Lapadula described in the article "Secure computer: unified exposition and multics interpretation, Technical Report ESD-TR-75-306, The Mitre Corporation, Bedford Mass., March 1976".

The proposed multi-level security model is defined by the following properties:

(1) if a method or a data processing procedure f1 of an object O1 seeks to invoke a method f2 of an object O2, the level of authorization held by f1 must dominate the level of sensitivity computed for f2;

(2) if a method f1 of an object O1 seeks to destroy an object O2, the authorization level held by f1 must dominate the sensitivity level held by O2;

(3) a method f2 of a server object O2 receives the authorization level of the method f1 of the client object O1 that invokes it;

(4) if a method f instantiates an object O of a class C which has an attribute A and a method M, then:

(4.1) the sensitivity level of the object O is equal to the maximum of the sensitivity level assigned to the class C and the authorization level held by f;

(4.2) the sensitivity level of the attribute A of the object O is equal to the maximum of the sensitivity level assigned to the attribute A of the class C, and the authorization level held by f; and (4.3) the sensitivity level of the method M of the object O is equal to the maximum of the sensitivity level assigned to the method M of the class C and the authorization level held by f;

(5) the sensitivity level of an instantiated class dominates that assigned to its parameterizable class;

(6) the sensitivity level of a subclass dominates that assigned to the superclass;

(7) the sensitivity level of a contained class dominates that assigned to the containing class;

(8) the sensitivity level of an attribute of a class dominates that assigned to the class; and (9) if an attribute A of a class C1 has a class C2 as its value, the sensitivity level of C2 is dominated by the sensitivity level assigned to A.

Figure 1:
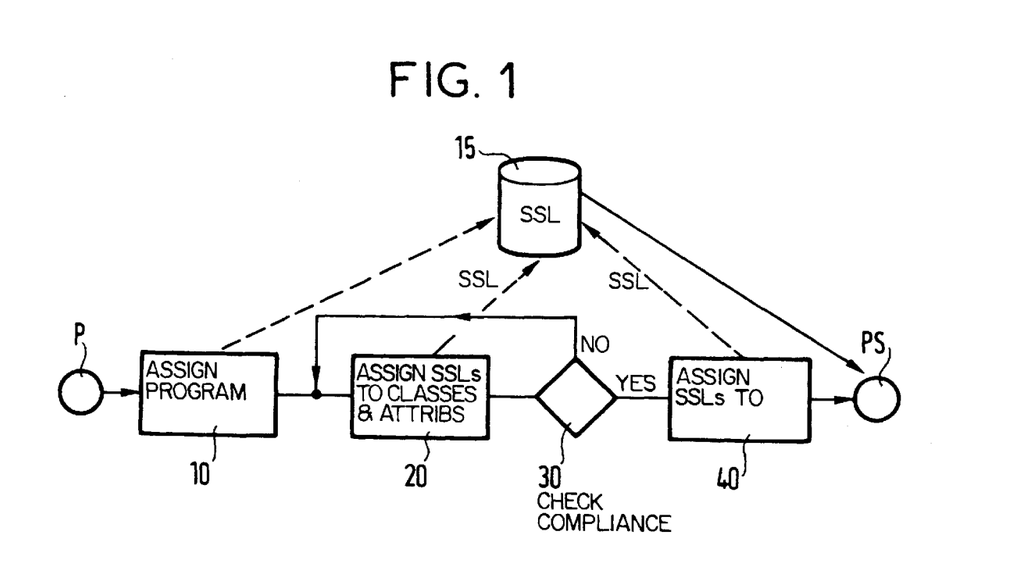
FIG. 1 shows very diagrammatically the various stages prior to implementing security mechanisms in the source code of an object-oriented program to be made secure.

In FIG. 1, the source code of the object-oriented program to be made secure is referenced P and generally includes one or more hierarchies of classes. Each class declaration includes a declaration of attributes and methods as is well known in object-oriented programming.

In the security model as defined above by the nine properties, properties (5) to (9), known as "static" properties, apply solely to classes, to class attributes, and to class methods. In contrast, properties (1) to (4), referred to as "dynamic" properties, apply to objects (instantiations of classes) and to their methods.

The code of the source program P is processed in an analysis stage 10 (optionally performed automatically by a syntax analyzer) to identify the various logical entities of the program, i.e. its classes, class attributes, and class methods. At the end of stage 10, a database structure 15 is created. This database is intended to contain so-called "static" sensitivity levels assigned to the various logical entities that have been declared in the program source code. More particularly, in the database 15, the identifiers of the logical entities (names of classes, attributes, etc . . . ) are listed in records that will subsequently receive the static sensitivity levels.

Thereafter, during stage 20, static sensitivity levels SSL are assigned to the declared classes and class attributes in the program. In other words, these static sensitivity levels are written into the database 15 in correspondence with the identifiers of the corresponding logical entities. During this stage 20, it is necessary to check in a stage 30 that the sensitivity levels assigned to the logical entities do indeed satisfy the static properties of the security model as defined above. This stage is normally performed by a data administrator authorized to make the program secure. In the negative, stage 20 is repeated.

In the affirmative, the static sensitivity levels SSL of the class methods are then computed at 40 and written into the database 15. Computing the sensitivity levels of the methods requires knowledge of the sensitivity levels of the attributes used by the read-only methods and the sensitivity levels of those used by read/write methods. The static sensitivity levels of the methods can also be computed during program execution.

At the end of stage 40, the database 15 is fully loaded with static sensitivity levels. The security mechanisms specific to enforcing the dynamic properties of the security model must then be implemented in the source code of the object-oriented program that is to be made secure. The program source code including these security mechanisms is then compiled to obtain a secure executable program referenced PS. When it is executed, the static sensitivity levels are used by the security mechanisms to compute dynamic sensitivity levels as described below. The static sensitivity levels can be read from the database 15 during execution of the program, but that can be penalizing from the point of view time of execution. It is preferable to load all of the static sensitivity levels into an internal data structure of the secure program when it is started.

It should be observed that these security mechanisms can be implemented during development of the program source code, in which case the database 15 is built at the end of development of the program source code. These security mechanisms can also be implemented in source code that already exists for a program, in which case implementation consists in modifying the source code, with such modification then being capable of being performed by automatic processing.

There follows a description of an example of security mechanisms implemented in the source code of an object-oriented program developed using the C++ language, which mechanisms are implemented by modifying existing source code.

Modification applies initially to the bodies of the class methods (including the object constructor and destructor) included in the source code of the program. For each method, a parameter representative of an authorization level is added to the method's parameter list. On execution, the authorization level is used as a token which passes from a client object to a server object, the server object receiving the authorization level as a parameter for one of its own methods, including the constructor, and passing it on as a client object to another server object when it invokes a method in said other server object. Also, in the body of each method, a check is added to compare the authorization level with a sensitivity level that is dynamically assigned at the moment of program execution.

The other security mechanisms are centralized in a superclass that is directly or indirectly inherited by all of the classes declared in the source code of the program. It is in this superclass that an object constructor is defined which dynamically assigns a sensitivity level to each method of an object during instantiation thereof. This dynamic sensitivity level is computed on the basis both of an authorization level passed as a parameter to the constructor by the client object of the constructor, and of static sensitivity levels assigned to the belonging class of the object and to the methods of said class. The dynamic sensitivity levels assigned to the object and to each of its methods are computed in application of the definition of property (4) of the security model. It is also within this superclass that an additional structure for archiving dynamic sensitivity levels is defined and managed. It is also in this superclass that a function is defined suitable for recovering the dynamic sensitivity level of each object method to be recovered from the additional archiving structure during invocation of the object method.

Appendix 1.A shows briefly the source code of an object-oriented program in the C++ language that is to be made secure. It includes a class CX and a method MX of type "Type" with parameters a of type "T1", b of type "T2" c of type "T3", etc.

Appendix 1.B shows briefly the source code of the object-oriented program of Appendix 1.A after modification. In Appendix 1.B, on line 3, class CX has become a subclass of a class SecurityObject__ by direct inheritance (in this example) or by indirect inheritance. In line 6, a pointer to a special object of this class has been added to class CX to maintain within the special object the static sensitivity levels of the class, of its attributes, and of its methods. In lines 8 and 23, the authorization parameter Auth of type SecurityLevel__ has been added to all of the method interfaces, including the object destructors and constructors. In line 25, a conditional clause has been added to the beginning of the body of each method. In lines 26 to 32, the body of each method includes a portion that is executable providing the authorization level Auth is sufficient compared with the (dynamic) sensitivity level is of the method Sens, and another portion is executable otherwise. At line 15, there is only one constructor with the interface including the authorization level. This construction is used by the security mechanism to create "ClassObject" objects and it must not be called by the class methods. In lines 10 and 11, use of the default constructor is made inoperative. All calls to constructors must include an authorization level Auth (the same applies to any method). In line 12, use of the default destructor is made inoperative. The default destructor "delete" is replaced by the method "Destroy__". In lines 19 and 20, in addition to adding an authorization level Auth in the interface of a constructor, it is also necessary to add a pointer to its superclass (in the present case, SecurityObject_). It should be observed that in this implementation, the access control clause is relatively independent of the code of the application methods of the program such that the above-described modifications are easy to perform automatically by means of a lexical analysis system.

Appendix 2 shows the contents of a file containing the source code of the class SecurityObject_. In line 3, the class SecurityObject_ must be inherited directly or indirectly by all of the classes to be made secure. In line 6, *SecurityObject_ is the class object for the class SecurityObject_ itself. In lines 19 and 20, the method Max_ returns the lowest security level (SL) that is greater than the two values passed as parameters. In this example, the security levels are implemented in the form of an enumeration of type SL, i.e. by total ordering. Thus, the value Max_ is merely the numerical maximum of the two parameters. Nevertheless, partial ordering could also be envisaged, and in that case the value returned could be different from the parameters. In line 28, in order to control object creation, the constructor interfaces have been modified. In the same way as an arbitrary secure class C is a subclass of the class SecurityObject_, execution of a constructor for C returns to execution of the constructor for SecurityObject_ which in turns calls the method Instantiate_. It is this method which dynamically computes and stores in memory the sensitivity level of an object, and of its methods and attributes. On the second page of Appendix 2, line 12, the method Destroy_ is used to control the destruction of an object. On lines 16 and 20 on the same page, the method Sens_ returns the sensitivity level of an object of or a method.

In Appendix 3, line 3, the security levels are selected from a set in strict order. At line 4, the type SL is encapsulated in the class SecurityLevel_. Lines 10 and 11 show the definitions of the operators = and >= in the set SL.

Appendix 4 shows the contents of another source file containing a function Secure_( ) which, for a class identifier passed as a parameter, recovers its static sensitivity level and creates an object of type Sensitivities_ containing the sensitivity level of the class and the sensitivity levels of the class methods. This function returns an object of the class Sensitivities_ defined in the file shown in Appendix 7 and which serves as an input parameter to the object constructor.

Appendix 5 shows the contents of a source file containing a function CreateClassObject_( ) which serves to create class objects in which the static sensitivity levels recovered from the database 15 are stored.

Appendix 6 shows the contents of a source file containing a class MethodSecurity_ which serves to save the sensitivity level of an object method. This class in fact defines an object which is an element of a list containing the dynamic sensitivity levels of all of the methods of an object.

Appendix 7 shows the contents of a source file containing the class Sensitivities_ which defines an object containing all of the sensitivity levels of a program object, i.e. the sensitivity level of the object itself and the first object of the list of objects of type SecurityMethod_.

Figure 2:
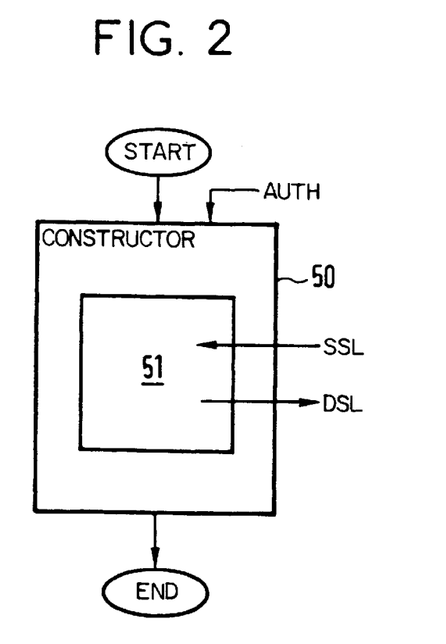
FIG. 2 shows the process of assigning a dynamic security level to a data processing procedure of an instantiated object.
Figure 3:
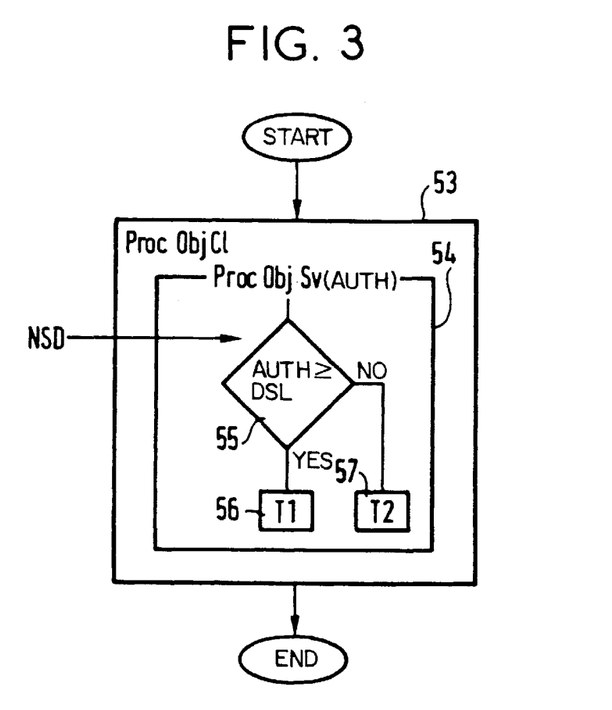
FIG. 3 shows the process of controlling an authorization level relative to a dynamic sensitivity level during execution of a data processing procedure of a server object.

FIG. 2 is a highly diagrammatic representation of the method of assigning a dynamic sensitivity level DSL to a procedure for processing an arbitrary object, and FIG. 3 is a highly diagrammatic representation of the checking process that takes place during collaboration between two data processing procedures, respectively of a client object and of a server object, in application of the implementation given in Appendices 1.B to 7.

In FIG. 2, the class object constructor referenced 50 is activated. It receives an authorization level AUTH from a client object, which authorization level was assigned to the client object following an access request via an authentication process, for example. The constructor 50 activates the method Instantiate_ referenced 51 which computes dynamically for each data processing procedure of the instantiated object, a dynamic sensitivity level DSL on the basis of the authorization level AUTH and of the static sensitivity levels SSL previously assigned to the data processing procedures of the class of this object. The dynamic sensitivity level(s) DSL computed for the data processing procedure(s) of this object are stored in memory, in the present case in the objects of the class Sensitivities_.

In FIG. 3, a data processing procedure 53 of a client object referenced ProcObjCl invokes another data processing procedure 54 of a server object. This procedure is referenced ProcObjSv. The authorization level AUTH of the client object is passed by means of the parameters of the invocation message to the procedure ProcObjSv 54. In the procedure ProcObjSv, the dynamic sensitivity level DSL computed for said procedure is recovered (by the method Sens_) and is compared at 55 with the authorization level AUTH. If the authorization level is sufficient compared with the sensitivity level, then first processing T1 referenced 56 is performed and this therefore corresponds to access being authorized. In other words, the processing T1 corresponds to normal processing implemented by the data processing procedure ProcObjSv. Otherwise, other processing T2 referenced 57 is performed and this therefore corresponds to access being barred.

Appendix 1.A

```
    Class CX
    {
5   ...
    C      Obj1;
    C      *Obj2=new C
    delete Obj2
    ...
10  Type MX(T1 a,T2 b, T3 c,...);
    ...
    }
    Type CX::MX(T1 a,T2 b,T3 c,...)
    {
15  ...
    }
```

Appendix 1.B

```
     Class CX: public SecurityObject_
     {
5    private
     static SecurityObject_ *CX_;
     ...
     Type MX(SecurityLevel_ Auth, T1 a, T2 b, T3 c,...);
     ...
10   C          Obj1(Auth);
     C          *Obj2(Auth);
     Obj2->Destroy_(Auth);
     ...
     }
15   CX(Sensitivities_ *Object_Security):SecurityObject_(Object_Security)
     {
     if(CX_==NULL) CX_=this;
     };
     CX(SecurityLevel_ Auth, SecurityObject_ *vClass=CX):SecurityObject_(Auth, vClass)
20   {
     ...
     };
     Type MX(SecurityLevel_ Auth, T1 a, T2 b, T3 c,...)
     {
25   if(Auth>=Sens_("CX::MX(SecurityLevel_ Auth"))
     {
     ...
     }
     else
30   {
     ...
     }
```

Appendix 2
include "Sensitivity.c"
class SecurityObject_
{
5  protected:
   static SecurityObject_ *SecurityObject_;
   Sensitivities_ *SObject_;
   SecurityLevel_ Max(SecurityLevel_ S1, SecurityLevel_ S2);
   };
10 void Instantiate_(SecurityLevel_ Auth, SecurityObject_ *vClass);
   void Destroy_(SecurityLevel_ Auth);
   SecurityLevel_ Sens_();
   SecurityLevel_ Sens_(char *Mi);
   public:
15 SecurityObject_(Sensitivity_ *Object_Security_);
   SecurityObject_(SecurityLevel_ Auth, SecurityObject_ *vClass=SecurityObject_);
   };
   SecurityLevel_ SecurityObject_::Max_(SecurityLevel_ S1,SecurityLevel_ S2)
   {
20 if(S1.Level>S2.Level)
     return S1;
   else
     return S2;
   };
25 void SecurityObject_::
       Instantiate_(SecurityLevel_ Auth, SecurityObject_ *vClass)
   {
   SObject_=new Sensitivities;
   SObject_->Sens_Oi_=Max_(vClass->SObject_->Sens_Oi_, Auth);
30 MethodSecurity_ *Ptr_O=new MethodSecurity_;
   SObject_->Sens_Mi_=Ptr_O;
   MethodSecurity_ *Ptr_C=new MethodSecurity_;
   Ptr_C=vClass->SObject_->Sens_Mi_;
   While ((Ptr_C!=NULL))
35   {
     Ptr_O->Ptr_Mi_=Ptr_C->Ptr_Mi_;

```
      Ptr_O->Sens_Mi_=Ptr_C->Sens_Mi_;
      Ptr_O->Sens_Mi_=Max_(Ptr_O->Sens_Mi_, Auth);
      Ptr-O->Next_=new MethodSecurity_;
      if(Ptr_C->Next_==NULL) Ptr_O->Next_=NULL;
5     Ptr_O=Ptr_O->Next_;
      Ptr_C=Ptr_C->Next_;
      };
   };
   void SecurityObject_::Destroy_(SecurityLevel_Auth)
10 {
     if(Auth>=Sens_()) delete this
   };
   SecurityLevel_ SecurityObject_::Sens_()
   {
15   return SObject_->Sens_();
   };
   SecurityLevel_ SecurityObject_::Sens_(char *Mi)
   {
     return SObject_->Sens_(Mi)
20 };
   SecurityObject_::SecurityObject_(Sensitivities_ *Object_Security)
   {
     SObject_=new Sensitivities;
     SObject_=Object_Security;
25   if(SecurityObject_==NULL) SecurityObject_=this;
   };
   SecurityObject_::SecurityObject_(SecurityLevel_ Auth, SecurityObject_ *vClass)
   {
     Instantiate_(Auth, vClass);
30 };
```

Appendix 3

```
    enum SL {CD,SD,TSD};
    class SecurityLevel_
 5  {
    public:
      SL Level;
      SecurityLevel_();
      SecurityLevel_(SL N);
10    void operator= (SecurityLevel_ S);
      int operator>= (SecurityLevel_ S);
    };
    SecurityLevel_::SecurityLevel_()
    {
15    Level=CD;
    };
    SecurityLevel_::SecurityLevel_(SL N)
    {
      Level=N;
20  };
    void SecurityLevel_::operator= (SecurityLevel_ S)
    {
      this->Level= S.Level;
    };
25  int SecurityLevel_::operator>=(SecurityLevel_ S)
    {
      return (this->Level >= S.Level);
    };
```

Appendix 4

```
    Sensitivities_ *Secure(char *vClass)
    {
5     Sensitivities_ *BuffT=new Sensitivities;
      MethodSecurity_ *Buffer=new MethodSecurity_;
      BuffT->Sens_Oi_=ReadClassSens(vClass);
      BuffT->Sens_Mi_=Buffer
      int NumberOfMethod=ReadNoOfMethods(vClass)
10    int index=1;
      while(index<NumberOfMethod)
      {
        Buffer->Ptr_Mi_=ReadMethodName(vClass, index);
        Buffer->Sens_Mi_=ReadMethodSens(vClass, index);
15      Buffer->Next_=new MethodSecurity_;
        Buffer=Buffer->Next_; index++;
      };
        Buffer->Ptr_Mi_=ReadMethodName(vClass, index);
        Buffer->Sens_Mi_=ReadMethodSens(vClass, index);
20      Buffer->Next_=NULL; return BuffT;
      };
```

Appendix 5

```
  void CreateClassObject_()
  {
5   SecurityObject_ *SecurityObject_= new SecurityObject_(Secure("SecurityObject_")),
    C1 *C1_=new C1(Secure("C1"));
    C2 *C2_=new C2(Secure("C2"));
  };
```

Appendix 6

```
    extern "C"
    int strcmp(char *, char *);
5   class MethodSecurity_
    {
    public:
      char *Ptr_Mi_;
      SecurityLevel_ Sens_Mi_;
10    MethodSecurity_ *Next_;
      SecurityLevel_ Sens_(char *Mi);
    };
    MethodSecurity_::Sens_(char *Mi)
    {
15    MethodSecurity_ *Ptr_Buf=this;
      char *Buf=Ptr_buf->Ptr_Mi_;
      SecurityLevel_ Sens_Buf=Ptr_Buf->Sens_Mi_;
      while ((strcmp(Buf, Mi)!=0) && (Ptr_Buf !=NULL))
      {
20      Ptr_Buf=Ptr_Buf->Next_;
        if(Ptr_Buf!=NULL)
        {
          Buf=Ptr_Buf->Ptr_Mi;
          Sens_Buf=Ptr_Buf->Sens_Mi_;
25      };
      };
      return (Sens_Buf);
    };
```

Appendix 7

```
   Class Sensitivities
   {
 5 public:
     SecurityLevel_ Sens_Oi_;
     MethodSecurity_ *Sens_Mi_;
     SecurityLevel_ Sens_();
     SecurityLevel_ Sens_(char *Mi);
10 };
   SecurityLevel_ Sensitivities::Sens_()
   {
    return Sens_Oi_;
   };
15 SecurityLevel_ Sensitivities::Sens_(char *Mi)
   {
    return Sens_Mi_->Sens_(Mi);
   };

20
```

We claim:

1. A method of making secure, in an object-oriented program, collaboration between a data processing procedure of a client object and another data processing procedure of a server object of said program, the method comprising:

assigning an authorization level to the client object;

assigning a dynamic sensitivity level to the data processing procedure of the server object when said server object is instantiated by an object constructor, said dynamic sensitivity level being computed on the basis of static sensitivity levels and the authorization level passed to the object constructor, the static sensitivity levels being held in a memory and being assigned respectively to different logical entities of the program;

causing the authorization level assigned to the client object to be passed to the data processing procedure of the server object along with the message sent by the data processing procedure of the client object to invoke the data processing procedure of said server object; and checking, in the data processing procedure of the server object, whether the authorization level, which has been passed thereto, corresponds to a sensitivity level sufficient to allow collaboration between the client object and the server object, by comparing the authorization level with the assigned dynamic sensitivity level of the server object.

2. The method of claim 1, wherein in said checking step, collaboration between the client object and the server object is allowed when the authorization level is higher than the dynamic sensitivity level.

* * * * *